(12) United States Patent
Zhang et al.

(10) Patent No.: US 10,712,365 B2
(45) Date of Patent: Jul. 14, 2020

(54) MICROFLUIDIC CELL FOR ATOMIC FORCE MICROSCOPY

(71) Applicant: New Jersey Institute of Technology, Newark, NJ (US)

(72) Inventors: Wen Zhang, Livingston, NJ (US); Wanyi Fu, Harrison, NJ (US)

(73) Assignee: New Jersey Institute of Technology, Newark, NJ (US)

(*) Notice: Subject to any disclaimer, the term of this patent is extended or adjusted under 35 U.S.C. 154(b) by 0 days.

(21) Appl. No.: 16/054,160

(22) Filed: Aug. 3, 2018

(65) Prior Publication Data

US 2019/0072582 A1 Mar. 7, 2019

Related U.S. Application Data

(60) Provisional application No. 62/554,122, filed on Sep. 5, 2017.

(51) Int. Cl.
| | | |
|---|---|---|
| *G01Q 30/14* | (2010.01) | |
| *G01Q 10/04* | (2010.01) | |
| *G01Q 70/10* | (2010.01) | |
| *G01Q 70/02* | (2010.01) | |
| *G01Q 60/38* | (2010.01) | |

(52) U.S. Cl.
CPC .......... *G01Q 30/14* (2013.01); *G01Q 10/045* (2013.01); *G01Q 60/38* (2013.01); *G01Q 70/02* (2013.01); *G01Q 70/10* (2013.01)

(58) Field of Classification Search
USPC .......................................................... 850/40
See application file for complete search history.

(56) References Cited

U.S. PATENT DOCUMENTS

| 7,260,980 B2 * | 8/2007 | Adams ................. G01Q 60/42 73/31.05 |
| 8,214,917 B2 * | 7/2012 | Sulchek ................ G01Q 30/14 250/310 |

OTHER PUBLICATIONS

Bieletzki, et al., "Topography and Work Function Measurements of Thin MgO(001) Films on Ag(001) by nc-AFM and KPFM", Physical Chemistry Chemical Physics, vol. 12, No. 13, Feb. 2010, pp. 3203-3209.

Boussu, et al., "Roughness and Hydrophobicity Studies of Nanofiltration Membranes Using Different Modes of AFM", Journal of Colloid and Interface Science, vol. 286, No. 2, Jun. 2005, pp. 632-638.

(Continued)

*Primary Examiner* — Phillip A Johnston
(74) *Attorney, Agent, or Firm* — Lerner, David, Littenberg, Krumholz & Mentlik, LLP

(57) ABSTRACT

A liquid cell for in situ atomic force microscopy (AFM) measurement of a sample during filtration is provided. The liquid cell includes a cantilever probe; a cantilever holder to position the probe near a surface of a sample (e.g., a filtration membrane); a liquid cell housing provided to hold the sample and comprising an opening at the top; an upper part; a lower part; an internal cavity to contain a fluid; a fluid inlet passage located in the upper part; a first fluid outlet passage located in the upper part; and a second fluid outlet passage located in the lower part. A method of in situ atomic force microscopy (AFM) measurement of a sample during filtration in a liquid by using the liquid cell described herein is also provided.

20 Claims, 2 Drawing Sheets

(56) References Cited

OTHER PUBLICATIONS

Bowen, et al., "Protein Deposition During Cross-Flow Membrane Filtration: AFM Studies and Flux Loss", Colloids and Surfaces B: Biointerfaces, vol. 27, No. 2-3, Feb. 2003, pp. 103-113.
Franz, et al., "Atomic Force Microscopy: A Versatile Tool for Studying Cell Morphology, Adhesion and Mechanics", Cellular and Molecular Bioengineering, vol. 1, No. 4, Dec. 2008, pp. 289-300.
Trotsenko, et al., "Probing Rough Composite Surfaces with Atomic Force Microscopy: Nafion Ionomer in Fuel Cell Electrodes", Polymer, vol. 102, Oct. 2016, pp. 396-403.

* cited by examiner

MICROFLUIDIC CELL FOR ATOMIC FORCE MICROSCOPY

CROSS-REFERENCE TO RELATED APPLICATION

This application claims the benefit of the filing date of U.S. Provisional Patent Application No. 62/554,122 filed Sep. 5, 2017, the disclosure of which is hereby incorporated herein by reference.

BACKGROUND OF THE INVENTION

The present disclosure relates to a liquid cell for microscopy and, more specifically, for atomic force microscopy ("AFM") imaging. In particular, the present disclosure is directed to a liquid cell such as a microfluidic cell for AFM measurement, which provides an in situ sample (e.g., a membrane) characterization during filtration.

AFM is a type of high resolution scanning probe microscopy, with resolution to the order of fractions of a nanometer. AFM is used to image sample surfaces at nanoscale, in different chemical environments, such as water, specific solutions, and buffers. Typically, imaging in a liquid environment is accomplished with a liquid cell. In a liquid cell, the AFM probe and the sample are immersed in a small volume of liquid. In this manner, the liquid cell enables AFM to measure the sample surface characteristics such as the surface morphology, surface potential, hydrophobicity, and conductivity in a sealed liquid environment.

Among many applications of the AFM liquid cell, observations of membrane fouling, foulant deposition, and membrane integrity (e.g., changes in physical, mechanical, and chemical properties) are particularly important for gaining mechanistic insight into interfacial and chemical processes that take place at nanoscaled membrane surfaces. AFM detects a force of interaction between the surface of a sample and a cantilever probe held near the surface of the sample.

Membranes are scanned with AFM before or after filtration experiments. After filtration in a membrane module, the membrane sample is transferred to an AFM liquid cell for AFM imaging. Such transfer may change the membrane integrity and the chemical environment. As a result, the ex situ measurement may reveal limited or no information of dynamic changes of membrane properties (e.g., deposition of particles or chemical foulants, substance distribution, and surface zeta potential changes) and may even compromise the measurement accuracy due to sample contamination or damage. Also, current commercial liquid cell designs contain a static fluid provided by pumping or injecting a reagent to the liquid cell, which does not simulate the practical hydrodynamic conditions during filtration.

Accordingly, there is a need for a well-designed liquid cell to allow real-time and in situ observations and measurements of membrane properties and surface characteristic evolutions during filtration, fouling, and/or aging processes.

BRIEF SUMMARY OF THE INVENTION

In accordance with embodiments of the present disclosure, a liquid cell for in situ atomic force microscopy (AFM) measurement of membrane properties during filtration is provided.

In one embodiment, the liquid cell includes a cantilever probe; a cantilever holder to position the probe near a surface of a sample (e.g., a filtration membrane); a liquid cell housing provided to hold the sample and comprising an opening at the top; an upper part; a lower part; an internal cavity to contain a fluid; a fluid inlet passage located in the upper part; a fluid outlet passage located in the upper part; and a fluid outlet passage located in the lower part. The liquid cell housing may be connected to a drive scanner stage that moves the sample for AFM measurement.

The liquid cell may include a lid part, which is coupled with the cantilever holder that holds and positions the cantilever probe near a surface of the sample through the opening of the liquid cell housing. The lid part may further comprise an optical window, through which a light beam transmits. The lid part may further comprise a piezoelectric vibrator, and the cantilever probe is actuated when a drive voltage is applied to the piezoelectric vibrator.

In one embodiment, a liquid cell with a dead-end or cross-flow mode of in situ AFM measurement of a sample during filtration is provided. The upper part and the lower part of the liquid cell housing may be separable by the sample, and the internal cavity may be separable by the sample to form an internal cavity above the sample and an internal cavity below the sample. The fluid inlet passage may connect the internal cavity above the sample with a fluid source, and the one fluid outlet passage in the upper part may connect the internal cavity above the sample with a retentate receiver, and the one fluid outlet passage in the lower part may connect the internal cavity below the sample with a permeate receiver. In one embodiment, at least one O ring may be placed at each side of the sample that is between the membrane and the upper part of the liquid cell housing and between the membrane and the lower part of the liquid cell housing, respectively. The sample may be a filtration membrane or surface foulants that deposit on the filtration membrane.

In another embodiment of the present disclosure, a method of in situ atomic force microscopy (AFM) measurement of a sample during filtration in a liquid by using the liquid cell described above is provided. The method comprises positioning a sample inside the liquid cell housing to separate the liquid cell housing into the upper part and the lower part, and separate the internal cavity of the liquid cell housing into an internal cavity above the sample and an internal cavity below the sample; disposing at least one O ring on each side of the sample that is between the membrane and the upper part of the liquid cell housing and between the membrane and the lower part of the liquid cell housing, respectively; connecting a fluid source to the fluid inlet passage, connecting a retentate receiver to the fluid outlet passage in the upper part, and connecting a permeate receiver to the fluid outlet passage in the lower part; injecting a fluid from the fluid source to the internal cavity above the sample through the fluid inlet passage; positioning the cantilever probe near a surface of the sample through the opening of the liquid cell housing; and making AFM measurements. The entire fluidic cell can be attached to the AFM piezoelectric drive scanner stage that moves the sample for sample surface scanning.

Any combination and/or permutation of the embodiments are envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using a liquid cell and the associated systems and methods, reference is made to the accompanying figures, wherein.

DETAILED DESCRIPTION

Figure 1:
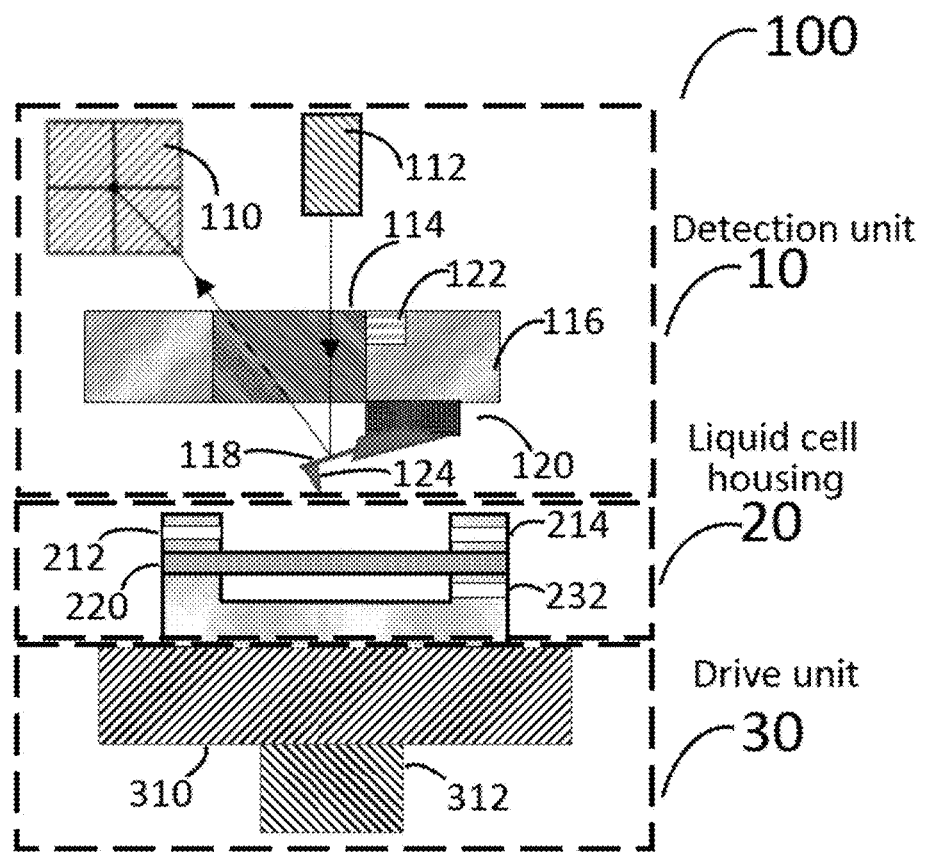
FIG. 1 illustrates a configuration of an AFM measurement system 100 in accordance with one embodiment of the present disclosure.

FIG. 1 illustrates a configuration of an AFM measurement system 100 in accordance with one embodiment of the present disclosure. The AFM measurement system 100 may include a detection unit 10, a liquid cell housing 20, and a drive unit 30 configured to move the liquid cell housing 20.

The detection unit 10 may comprise a position detection sensor 110, a light beam source 112, and a lid part 116 that is coupled with a cantilever holder 120 for holding a cantilever 118. The lid part 116 comprises an optical window 114 and a piezoelectric vibrator 122. The cantilever 118 has one end where a probe 124 is provided, and an opposite end that is mechanically clipped, screwed, or mounted securely to the cantilever holder 120 that is coupled to the lid part 116.

The AFM measurement system 100 is configured to detect the displacement magnitude of the cantilever 118 by an optical lever method. In operation, a light beam, such as a laser beam, emitted from the light beam source 112, transmits through the optical window 114, and is reflected off the back side of the cantilever 118. It is understood that other types of light beams may be utilized. The optical window 114 is transparent and may be made of a material such as a glass, through which a light beam transmits, to optically monitor the cantilever probe 124. It is understood that the optical window 114 may be made from any suitable materials, such as plastics, quartz, or other translucent materials. The reflected light transmits through the optical window 114, and is detected by the position detection sensor 110. The position detection sensor 110 may comprise, for example, a position-sensitive detector (PSD), a photodiode, a photodiode array, or a photodetector array. The lid part 116 is coupled with the cantilever holder 120 for holding the cantilever 118 to position the probe 124 near the measurement surface, i.e., the surface of a membrane such as the membrane 220. The probe 124 is actuated when a drive voltage is applied to the piezoelectric vibrator 122. The cantilever 118 is displaced depending on the force of interaction working between the sample, e.g., the membrane 220, and the probe 124.

The drive unit 30 may be a drive scanner stage that moves horizontally or vertically a sample for sample surface scanning. The drive scanner stage, for example, may include a sample holder 310 and a scanner 312. The sample holder 310 fixes to the liquid cell housing 20 by using any conventional methods, such as magnetism. The scanner 312 may be motorized so that it may move the sample holder 310 in a horizontal plane. Moreover, the scanner 312 may move the sample holder 310 vertically so that it may control the distance between the probe 124 and the sample, e.g., the membrane 220. As shown in FIG. 1, the detection unit 10 and the liquid cell housing 20 are not mechanically joined in this embodiment.

Figure 2:
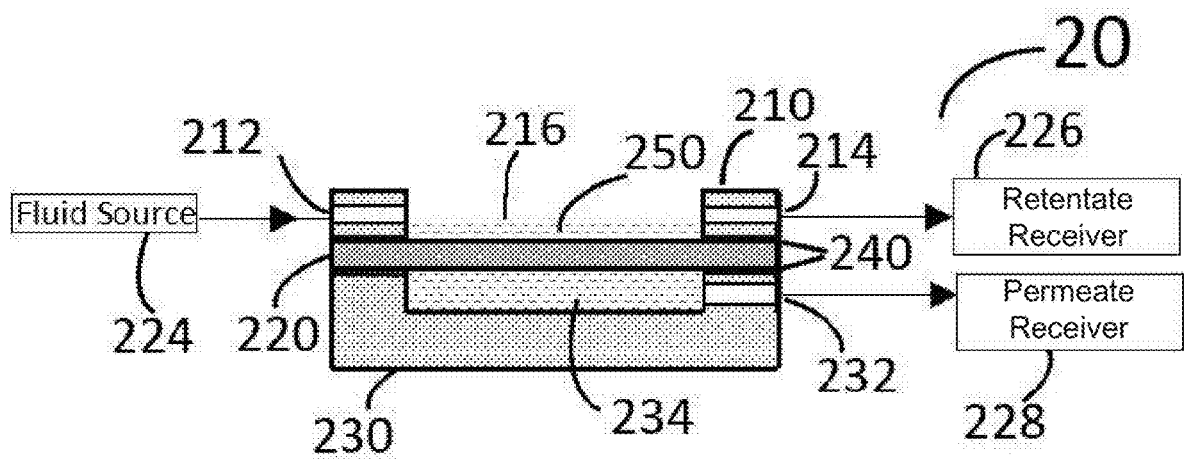
FIG. 2 is a cross-sectional view of a liquid cell housing 20 incorporated with a filtration system having a filtration membrane 220 immersed in a fluid 250 inside the liquid cell housing 20.

FIG. 2 illustrates a perspective view of a liquid cell housing 20, in accordance with one embodiment of the present disclosure. The liquid cell housing 20 may contain an internal cavity or a void chamber space used to contain fluid, such as a fluid 250, including water, alcohol, and other specific solutions. The size of such internal cavity or void chamber space may vary and usually may be large enough to contain the sufficient fluid 250 to immerse a membrane 220. As shown, the liquid cell housing 20 may be separated by the membrane 220 to form an upper part 210 and a lower part 230 of the liquid cell housing 20, and thus the internal cavity or void chamber space of the liquid cell housing 20 is separated by the membrane 220 to form an internal cavity or a void chamber space 216 in the housing upper part 210, and an internal cavity or a void chamber space 234 in the housing lower part 230. The internal cavities 216 and 234 may be used to contain fluid, such as a fluid 250, and the effluent crossing/filtered from the membrane 220, respectively.

At least one O ring 240 may be placed at each side of the membrane 220. As such, the liquid cell housing 20 may include a liquid cell housing upper part 210, a liquid cell housing lower part 230, a membrane 220, at least one first rubber O ring 240 placed between the liquid cell housing lower part 230 and the membrane 220, and at least one second rubber O ring 240 placed between the membrane 220 and the liquid cell housing upper part 210. The liquid cell housing upper part 210 may be open at the bottom so that the fluid 250 may immerse into the membrane 220, while the liquid cell housing lower part 230 may be closed at the bottom to form a sealed cell. While only two O rings are shown, it is understood that the number of O rings may vary.

The liquid cell housing 20 may be assembled by first disposing a first O ring 240 on a liquid cell housing lower part 230, followed by disposing a membrane 220 on the first O ring 240. Then a second O ring 240 may be disposed on the membrane 220, and followed by the liquid cell housing upper part 210 being disposed on the second O ring 240.

The liquid cell housing 20 including the upper part 210 and the lower part 230 may be formed from plastic, metal, glass, quartz, or any suitable material for housing the membrane 220 and the fluid 250. For example, the upper part 210 and the lower part 230 of the liquid cell housing 20 may be made of plastic, metal, glass, quartz, or any suitable materials, such as polyvinyl chloride (PVC), Polymethyl methacrylate (PMMA), and Polytetrafluoroethylene (PTFE) to achieve desirable properties of housing materials such as insulation, transparency or translucency.

Liquid cell housing upper part 210 and lower part 230 are generally open on the top to allow the cantilever probe to engage into the cell chamber and approach the membrane surface 220 to be analyzed while the membrane surface 220 is in the fluid 250 during a filtration process. The fluid 250 may be injected or pumped into the liquid cell housing upper part 210 through a fluid inlet passage 212 located in the upper part 210. The fluid inlet passage 212 is connected between the upper part cavity 216 and a fluid source 224. The liquid may be exhausted through a first fluid outlet passage 214 located in the upper part 210 to a retentate receiver 226, so that the liquid may be recirculated or otherwise discarded. The effluent crossing/filtered by the membrane 220 may be exhausted through a second fluid outlet passage 232 located in the lower part 230 to a fluid receiver 228, as a permeate.

Pumps, valves, or other fluidic control devices may be included to aid in the transport of fluids to and from liquid cell housing upper part 210 and lower part 230, and seals around the fluid inlet passage 212, and the first fluid outlet passage 214 and the second fluid outlet passage 232 may be used to minimize leakage. The fluid inlet passage 212 and fluid outlet passages 214 and 232 may be designed as a screw hole or a straight hole for fluid passage.

The membrane filtration system may include the membrane 220, the fluid source 224 connected with the fluid inlet passage 212, the retentate receiver 226 connected with the first fluid outlet passage 214, and another permeate receiver 228 connected with the second fluid outlet passage 232. In operation, the fluid 250 may be injected or pumped from the fluid source 224 to provide liquid to the cavity 216 of the upper part 210 through the fluid inlet passage 212, and to be filtered by the membrane 220. The retentate fluid may exit the liquid cell 20 through the first fluid outlet passage 214 to the retentate receiver 226. In one embodiment, the first fluid outlet passage 214 may be sealed or blocked with no fluid discharged to the retentate receiver 226. The permeate fluid in the membrane 220 can be withdrawn downward by a vacuum or peristaltic pump providing proper vacuum pressure force that will not induce significant levels of sample vibration or other disturbance while withdrawing the permeate liquid across the membrane 220 to the permeate receiver 228 through the second fluid outlet passage 232.

Examples of different types of filtration membranes suitable for use with the present disclosure include, but are not limited to, flat sheet membranes with different shapes. The membrane materials include, but are not limited to, polymeric, ceramic and combination thereof.

Figure 3:
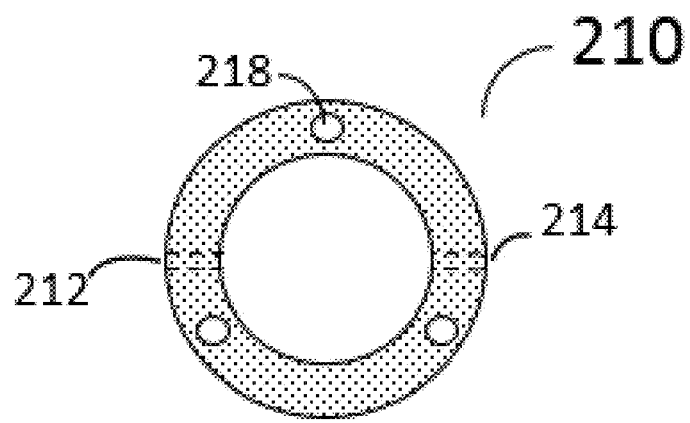
FIG. 3 is a top view of a liquid cell housing upper part 210.

FIG. 3 is a top view of the liquid cell housing upper part 210, which includes screw holes 218, upper part cavity 216 (FIG. 2) with a certain height, one fluid inlet passage 212, and one first fluid outlet passage 214. The liquid cell housing upper part 210 may be formed from plastic, metal, or any suitable material for housing the membrane 220 and the fluid 250. For example, the liquid cell housing upper part 210 may comprise a material such as PVC, glass, quartz, a polymer and an insulating material, or a transparent material. Three or more screw holes 218 with different thickness, shapes, and sizes may be used. Although three screw holes 218 are shown, the number of screw holes used may vary. The fluid inlet passage 212 is connected between the liquid cell housing upper part cavity 216 and a fluid source 224. The size and shape of the fluid inlet passage 212 may vary. The liquid may be exhausted through the first fluid outlet passage 214 above the membrane 220 to a retentate receiver 226, to be discarded or recirculated. The size and shape of the first fluid outlet passage 214 may vary.

Figure 4:
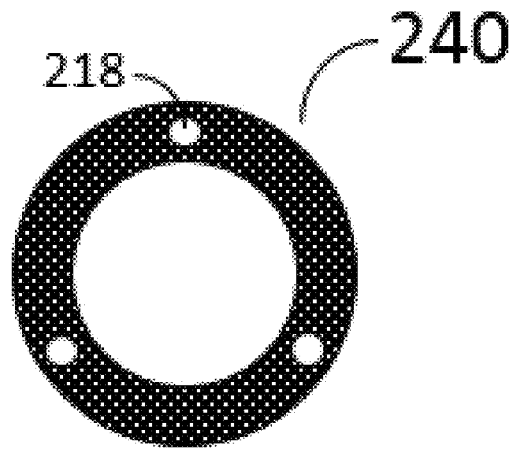
FIG. 4 is a top view of a liquid cell housing O ring 240.

FIG. 4 is a top view of a liquid cell housing O ring 240, which may be formed from plastic, rubber, or any suitable material for leakage prevention. Three or more screw holes 218 with different thickness, shapes, and sizes, depending on the different thickness, shapes, and sizes of the liquid cell housing parts 210 and 230, may be used. Although three screw holes 218 are shown, the number of screw holes used may vary.

Figure 5:
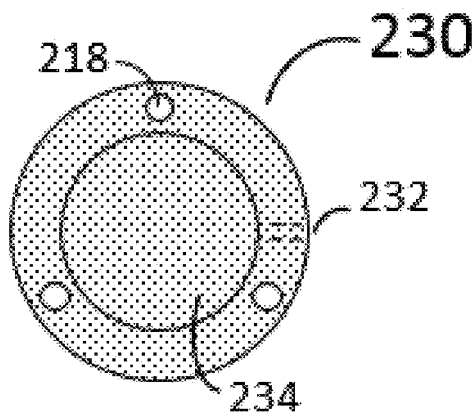
FIG. 5 is a top view of a liquid cell housing lower part 230.

FIG. 5 is a top view of a liquid cell housing lower part 230, which includes screw holes 218, one lower part cavity 234 with certain depth, and one second fluid outlet passage 232. The liquid cell housing lower part 230 may be formed from plastic, metal, or any suitable material for housing the membrane 220 and the effluent crossing/filtered of the fluid 250 by the membrane 220. For example, the liquid cell housing lower part 230 may comprise a material such as PVC, glass, quartz, a polymer and an insulating material, or a transparent material. Three or more screw holes 218 with different thickness, shapes, and sizes may be used. Although three screw holes 218 are shown, the number of screw holes may vary. The effluent crossing/filtered by the membrane 220 may be exhausted through a second fluid outlet passage 232 below the membrane to a fluid receiver 228, as a permeate. The size and shape of the second fluid outlet passage 232 may vary.

The AFM liquid cell according to one embodiment is described above. However, the present disclosure is not limited to this embodiment. For instance, in the above figures, shapes of each structural element are illustrated roundly. However, the present invention also includes sharp corners, rectangular, squared, and curved sides formed for manufacturing reasons. The assembly, arrangement, and connection of the structural elements may vary. For instance, the structural elements included in the liquid cell could be assembled with screws, clamps or any methods to avoid fluid leakage. For instance, two parts of the liquid cell housing may have a screw structure to be assembled as one part to avoid fluid leakage.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A microfluidic cell for in situ atomic force microscopy (AFM) measurement of a sample, the liquid cell comprising:
    a cantilever holder attached to a cantilever probe to position the cantilever probe near a surface of a sample;
    a lid part coupled to the cantilever holder;
    a microfluidic cell housing for atomic force microscopy (AFM) measurement or imaging of the sample during filtration, the microfluidic cell housing includes a top surface defining an opening, an upper part, a lower part, an inlet passage and a first fluid outlet passage both located in the upper part, a second fluid outlet passage located in the lower part, and an internal cavity defined by the microfluidic cell housing for a filtering fluid that is moving by being injected or pumped into the upper part through the inlet passage; and
    wherein, the microfluidic cell housing allows real-time and in situ observations and measurements of membrane properties and surface characteristic evolutions during filtration, fouling, and/or aging processes of the sample, wherein the filtering fluid is not static and continuously passes through the sample and changes sample properties due to deposition of particles in the filtering fluid.

2. The microfluidic cell of claim 1, wherein the upper part and the lower part is separable by the sample, and the internal cavity is separable by the sample to form an upper internal cavity above the sample and a lower internal cavity below the sample.

3. The liquid microfluidic cell of claim 1, wherein the lid part further comprises an optical window, through which a light beam transmits.

4. The microfluidic cell of claim 1, wherein the lid part further comprises a piezoelectric vibrator, wherein the cantilever probe is actuated when a drive voltage is applied to the piezoelectric vibrator.

5. The microfluidic cell of claim 3, wherein the optical window is made from a translucent material selected from glass, plastics, or quartz.

6. The microfluidic cell of claim 1, wherein the liquid microfluidic cell housing is made from polyvinyl chloride (PVC), glass, quartz, an insulating material, or a transparent or translucent material.

7. The microfluidic cell of claim 1, wherein the inlet passage connects the internal cavity above the sample with a fluid source, and the first fluid outlet passage in the upper part connects the internal cavity above the sample with a retentate receiver, and the second fluid outlet passage in the lower part connects the internal cavity below the sample with a permeate receiver.

8. The microfluidic cell of claim 1, wherein at least one O ring is placed at each side of the sample.

9. The microfluidic cell of claim 7, wherein the first fluid outlet passage is sealed or blocked with no fluid discharged to the retentate receiver.

10. The microfluidic cell of claim 1, further comprising a fluidic control device that is connected to the inlet passage and/or the first and second fluid outlet passages.

11. The microfluidic cell of claim 10, wherein the fluidic control device is a pump or a valve.

12. The microfluidic cell of claim 1, wherein the inlet passage and/or the first and second fluid outlet passages are a screw hole or a straight hole.

13. The microfluidic cell of claim 1, wherein the sample is a membrane.

14. The microfluidic cell of claim 1, wherein the microfluidic cell housing is connected to a drive scanner stage that moves the sample for AFM measurement.

15. A system for in situ atomic force microscopy (AFM) measurement of a sample, comprising:
a cantilever holder attached to a cantilever that is attached to a cantilever probe to position the cantilever probe near a surface of a sample;
a lid part coupled to the cantilever holder;
a microfluidic cell housing for atomic force microscopy (AFM) measurement or imaging of the sample during filtration, the microfluidic cell housing includes a top surface defining an opening, an upper part, a lower part, an inlet passage and a first fluid outlet passage both located in the upper part, a second fluid outlet passage located in the lower part, and an internal cavity defined by the microfluidic cell housing to contain a filtering fluid that is moving due to a vacuum pump or a peristalic pump;
a position detection sensor selected from a group consisting of a position-sensitive detector (PSD), a photodiode, a photodiode array, and a photodetector array for detecting reflected light off of a back side of the cantilever;
a light beam source to transmit a light beam onto the backside of the cantilever, and
wherein, the microfluidic cell housing allows real-time and in situ observations and measurements of membrane properties and surface characteristic evolutions during filtration, fouling, and/or aging processes of the sample, wherein the filtering fluid is not static and continuously passes through the sample and changes sample properties due to deposition of particles in the filtering fluid.

16. The system of claim 15, further comprising a drive scanner stage that moves the sample for AFM measurement.

17. A method of in situ atomic force microscopy (AFM) measurement of a sample during filtration in a liquid, comprising:
providing the microfluidic cell of claim 1;
positioning the sample or a membrane inside the microfluidic cell housing to separate the microfluidic cell housing into the upper part and the lower part, and separate the internal cavity of the liquid cell housing into an internal cavity above the sample and an internal cavity below the sample;
disposing at least one 0 ring on each side of the sample or the membrane;
connecting a fluid source to the fluid inlet passage, connecting a retentate receiver to the fluid outlet passage in the upper part, and connecting a permeate receiver to the fluid outlet passage in the lower part;
injecting or pumping continuously during a filtration process a fluid from the fluid source to the internal cavity above the sample or the membrane through the fluid inlet passage;
positioning the cantilever probe near a surface of the sample or the membrane through the opening of the liquid cell housing; and
analyzing and making AFM measurements during the filtration process of the surface of the sample or membrane by detecting displacement of the cantilever probe.

18. The method of claim 17, wherein the microfluidic cell housing is connected to a drive scanner stage that moves the sample or the membrane for AFM measurement.

19. The method of claim 17, wherein the lid part of the microfluidic cell further comprises an optical window and a piezoelectric vibrator.

20. The method of claim 17, further includes:
exhausting the fluid crossing or filtered by the sample or membrane through the second fluid outlet passage located in the lower part of the microfluidic cell housing, and
exhausting the fluid not crossing or filtered by the sample or membrane through the first fluid outlet passage located in the upper part of the microfluidic cell housing to a retentate receiver for recirculation or disposable.

* * * * *